United States Patent [19]

McManis, III et al.

[11] Patent Number: 4,654,278

[45] Date of Patent: Mar. 31, 1987

[54] THERMAL CELL NON-DEFLAGRATION DESIGN

[75] Inventors: George E. McManis, III; Melvin H. Miles; Aaron N. Fletcher, all of Ridgecrest, Calif.

[73] Assignee: The United States of America as represented by the Secretary of the Navy, Washington, D.C.

[21] Appl. No.: 537,216

[22] Filed: Sep. 29, 1983

[51] Int. Cl.⁴ ............................................. H01M 6/36
[52] U.S. Cl. .................................... 429/112; 429/199; 429/203
[58] Field of Search ................ 429/112, 103, 199, 203

[56] References Cited

U.S. PATENT DOCUMENTS

| | | |
|---|---|---|
| 3,527,615 | 9/1979 | Clark et al. ............................ 136/83 |
| 3,575,714 | 4/1971 | Bennett et al. ........................ 136/83 |
| 4,184,018 | 1/1980 | Fletcher et al. ...................... 429/199 |
| 4,190,704 | 2/1980 | Miles et al. ........................... 429/103 |
| 4,200,686 | 4/1980 | Fletcher ............................... 429/112 |
| 4,260,667 | 4/1981 | Miles et al. ........................... 429/112 |
| 4,416,958 | 11/1983 | Miles et al. ...................... 429/112 X |

Primary Examiner—Donald L. Walton
Attorney, Agent, or Firm—William C. Townsend; W. Thom Skeer

[57] ABSTRACT

A thermal battery cell with a fiberglass wrapping and facial pressure as a means for wetting the calcium anode to prevent deflagration or flashing using either a homogeneous $LiClO_4$ and $AgNO_3$ electrolyte or a non-homogeneous electrolyte arrangement of $LiCl$, $LiNO_3$ and $AgNO_3$.

11 Claims, 1 Drawing Figure

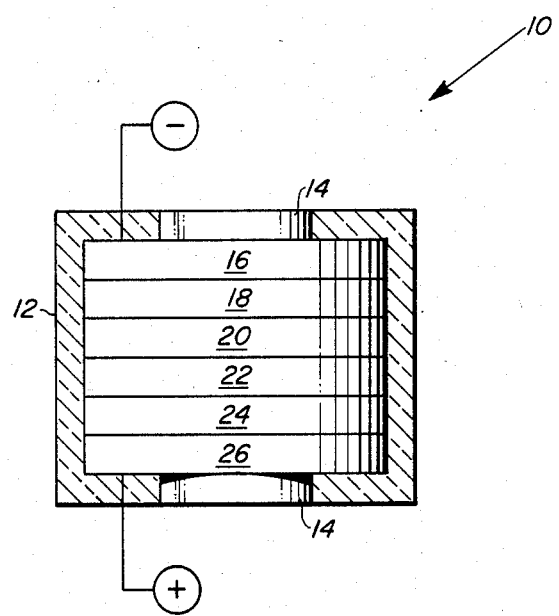

4,654,278

THERMAL CELL NON-DEFLAGRATION DESIGN

BACKGROUND OF THE INVENTION

1. Field of the Invention

This invention relates to electrochemical cells. More particularly, this invention relates to electrochemical cells for use in thermal batteries. In particular, this invention relates to thermal battery cells employing calcium anodes and oxidizing molten nitrate and perchlorate salts.

2. Description of the Prior Art

Calcium anodes have been used with molten nitrate electrolytes in thermal battery cells to obtain high voltage outputs. A problem with this combination has been flashing. Flashing refers to the rapid, self-sustaining reaction of depassivated calcium with nitrate, yielding a flash of light. This problem was avoided in U.S. Pat. No. 4,184,018 by the use of a non-flashing electrolyte containing potassium, nitrate and chloride ions. When thermal battery cells containing lithium perchlorate and lithium nitrate were scaled up in size, the problem of the calcium anode flashing or deflagrating returned.

Previous thermal battery systems have utilized homogeneous mixtures as the electrolyte. The use of additives to the electrolyte has been found to improve performance of the cathode and the anode. U.S. Pat. No. 4,190,704 describes the use of chloride ion to improve the calcium anode performance. $AgNO_3$ has been used as an additive to improve cathode performance and allow a higher current density. The use of homogeneous mixtures has not effectively utilized the additives in increasing power density.

OBJECTS OF THE INVENTION

One object of the present invention is to eliminate the flashing problem of the scaled up thermal battery cells.

Another object of the invention is to more efficiently utilize the electrolyte additives used to increase power density.

These and other objects, advantages and novel features of the present invention will become apparent from the following detailed description of the invention.

SUMMARY OF THE INVENTION

The present invention achieves the above objects by providing an electrochemical cell having a calcium anode, a cathode, electrolyte disposed between the cathode and the anode, and means for wetting the edges of the anode with the electrolyte. Further, the present invention can include a separator between the cathode and the anode to separate the additives to different portions of the cell.

BRIEF DESCRIPTION OF THE DRAWING

The FIGURE shows the components of the thermal battery cell.

DETAILED DESCRIPTION OF THE INVENTION

Referring to the FIGURE, the optional cell configuration of a thermal battery cell 10 includes a stack of elements surrounded by a sleeve 12 and pressed together by spring washers 14. Sleeve 12 can be glass or fiberglass. The enclosed stack of elements includes a current collector 16, an anode 18, an electrolyte layer 20, a separator 22, an electrolyte layer 24, and a cathode 26. Current collector 16 adjacent to anode 18 is connected to the negative lead and cathode 26 is connected to the positive lead.

Anode 18 is made of calcium. Either nickel or iron is suitable for current collector 16. In one particular embodiment, electrolyte layer 20 comprises a mixture of $LiNO_3$ and LiCl and electrolyte layer 24 comprises a mixture of $LiNO_3$ and $AgNO_3$. These two layers of electrolyte are divided by separator 22, which can be a fiberglass binder containing $LiNO_3$. This design results in a non-homogeneous electrolyte mixture throughout the cell.

Lithium nitrate ($LiNO_3$) is a strong oxidizing agent (m.p. 261° C.). The calcium anode in contact with molten $LiNO_3$ during cell operation rapidly forms a non-stoichiometric calcium oxide film and can limit the passage of large current densities. The chloride ion attacks the film allowing for high rate discharge at useful potentials. The present design concentrates the chloride ion in the vicinity of the anode by use of separator 22.

On the cathode side of separator 22, the electrolyte layer includes $LiNO_3$ and $AgNO_3$. Although nitrate species are reducible, the electrode product of insoluble $Li_2O$ precipitates on cathode 26 and can prevent high rate discharge due to film resistivity. The inclusion of the silver nitrate ($AgNO_3$) additive in the $LiNO_3$ electrolyte allows for the reduction of silver ions to be utilized as the cathodic reaction as well as the reduction of nitrate ions. The silver ion reduction in molten $LiNO_3$ has been shown to sustain current densities of 100 $mA/cm^2$ without severe polarization. The fiberglass with $LiNO_3$ separator 22 effectively prevents the formation of a dense insoluble resistive AgCl layer.

In another embodiment, electrolyte layer 20 and electrolyte layer 24 include a mixture of $LiClO_4$ and $AgNO_3$. In contrast to $LiNO_3$, no added LiCl is required since the $LiClO_4$ will react with calcium at temperatures above 250° C. to produce LiCl to depassivate the film upon anode 18.

A problem with the cells utilizing $LiClO_4$ was a tendency for thermal runaway followed by anode deflagration or flashing at temperatures above 350° C. The autocatalytic decomposition of $LiClO_4$ can produce LiCl and hot $O_2$ gas at the temperatures above 350° C. The hot gases react with calcium anode 18 and will flash or deflagrate. In the $LiNO_3$ electrolyte cells, deflagrations were attributed to reaction with $O_2$ generation from the thermal decomposition of $LiNO_3$ to give off oxygen at high temperatures.

The design of the present invention includes a means for wetting the edges of the anode with the electrolyte of the cell. A glass or fiberglass sleeve 12 can serve as a means for wetting the anode edges. The molten electrolyte will be contained by sleeve 12 and coat or wet the anode edges preventing contact between anode 18 and any hot oxygen gas. The means for wetting additionally can include the application of moderate facial pressure which can be supplied by spring washers 14. This further prevents the calcium metal from reacting with any hot oxygen gas. The use of the above means of wetting the edges of the anode has effectively eliminated deflagration problems in cells with calcium anodes and $LiNO_3$ or $LiClO_4$ electrolyte melts.

The electrolyte layers of the present invention are constructed as electrolyte wafers. The desired electrolyte is mixed with silica (Cab-O-Sil) as a binder and pressed at high pressures of around 80,000 psi for over ten minutes to obtain the wafer or electrolyte layer.

Obviously, many modifications and variations of the present invention are possible in light of the above teachings. It is therefore to be understood that within the scope of the appended claims the invention may be practiced otherwise than as specifically described.

What is claimed is:

1. An electrochemical cell comprising:
   a calcium anode;
   a cathode;
   an electrolyte mixture comprising $LiClO_4$ and $AgNO_3$; and
   means for wetting the edges of said anode with said electrolyte.

2. The cell of claim 1 wherein the means for wetting the edges of said anode comprises:
   a fiberglass wrapping; and
   two spring washers, one positioned at the anode end of the cell and the other positioned at the cathode end of the cell, both exerting facial pressure.

3. A thermally activated electrochemical cell including:
   a calcium anode;
   a cathode;
   an electrolyte which is disposed between said anode and cathode, is an electrically non-conductive solid but becomes an electrolyte in the molten state; and
   means for holding said molten electrolyte in contact with said anode edges whereby said anode edges are wetted by said molten electrolyte.

4. A thermally activated electrochemical cell as set forth in claim 3 further comprising:
   a separator disposed between said anode and cathode, said separator being impregnated with electrolyte;
   $LiNO_3$ electrolyte impregnating said separator;
   a LiCl and $LiNO_3$ layer disposed between said calcium anode and said separator; and
   a $AgNO_3$ and $LiNO_3$ layer disposed between said cathode and said separator.

5. A thermally activated electrochemical cell as set forth in claim 3 wherein said electrolyte is $LiClO_4$ and $AgNO_3$.

6. A thermally activated electrochemical cell comprising:
   a calcium anode;
   a cathode;
   a separator disposed between said anode and cathode, and impregnated with $LiNO_3$ electrolyte;
   a LiCl and $LiNO_3$ layer disposed between said calcium anode and said separator;
   a $AgNO_3$ and $LiNO_3$ layer disposed between said cathode and said separator; and
   means for holding said molten electrolyte in contact with said anode edges in a manner to insure said anode edges are wetted by said molten electrolyte preventing gas from contacting said anode.

7. A thermally activated electrochemical cell as set forth in claim 6 wherein said separator is a fiberglass binder.

8. A thermally activated electrochemical cell as set forth in claim 6 wherein said means for holding said molten electrolyte in contact with said anode edges comprises:
   a cell sleeve surrounding said anode, cathode, and electrolyte; and
   resilient means within said sleeve, positioned on the anode side and cathode side of said cell for exerting facial pressure on said cell.

9. A thermally activated electrochemical cell as set forth in claim 8 wherein said cell sleeve comprises glass.

10. A thermally activated electrochemical cell as set forth in claim 8 wherein said cell sleeve comprises fiberglass.

11. A thermally activated electrochemical cell as set forth in claim 8 wherein said resilient means for exerting facial pressure on said cell comprises spring washers.

* * * * *